United States Patent [19]

Cheffer

[11] Patent Number: 4,484,084

[45] Date of Patent: Nov. 20, 1984

[54] POWER MOSFET TRANSFER SWITCH

[75] Inventor: Harold H. Cheffer, Longwood, Fla.

[73] Assignee: NCR Corporation, Dayton, Ohio

[21] Appl. No.: 525,209

[22] Filed: Aug. 22, 1983

[51] Int. Cl.³ .............................................. H02J 9/06
[52] U.S. Cl. ....................................... 307/64; 307/66;
307/130; 307/140; 307/584; 323/288; 323/319
[58] Field of Search ....................... 307/44, 45, 46, 48,
307/64, 66, 87, 130, 140, 584; 323/235, 288, 319

[56] References Cited

U.S. PATENT DOCUMENTS

| | | | |
|---|---|---|---|
| 3,906,251 | 9/1975 | Tanida et al. | 307/45 |
| 4,087,697 | 5/1978 | Johnson | 307/66 |
| 4,400,624 | 8/1983 | Ebert, Jr. | 307/66 X |
| 4,438,356 | 3/1984 | Fleischer | 307/584 X |

Primary Examiner—A. D. Pellinen
Assistant Examiner—Derek Jennings
Attorney, Agent, or Firm—J. T. Cavender; Wilbert Hawk, Jr.; Richard W. Lavin

[57] ABSTRACT

A switching circuit in a power supply for switching between a main power source and a standby power source includes gating device operated at the time failure of the main power source occurs to disable the operation of a plurality of MOSFETs which are switched by high frequency clock signals to couple the main power source to a load. When the main power source returns, the gating device switches the MOSFETs in synchronization with the power signals supplied by the main power source. The circuit includes a transformer operated by the high frequency clock signals to switch the MOSFETs, enabling the transfer of the power signals from the main source to the standby source to occur at the time the main power source fails.

13 Claims, 8 Drawing Figures

FIG. 3A
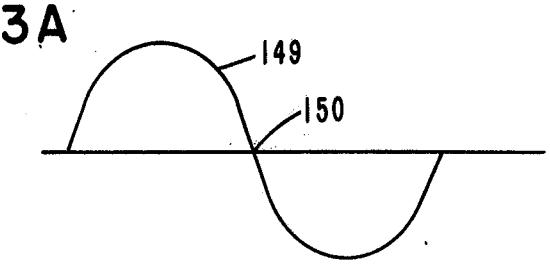
FIG. 3B
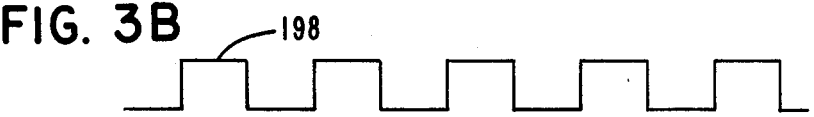
FIG. 3C
FIG. 3D
FIG. 4
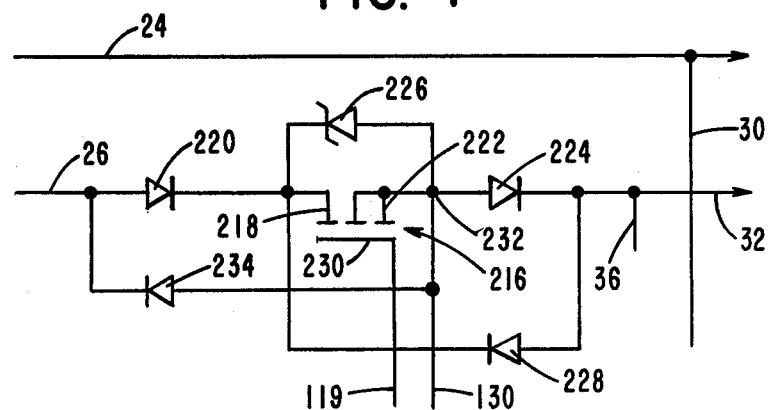

POWER MOSFET TRANSFER SWITCH

CROSS-REFERENCE TO RELATED APPLICATIONS

Phase Synchronization Circuit, co-pending application, Ser. No. 525,369 filed on Aug. 22, 1983, invented by Paul M. Rhoads and Harold H. Cheffer, assigned to the NCR Corporation.

Snubber Circuit For Use in An Uninterruptible Power Supply, co-pending application, Ser. No. 525,370, filed on Aug. 22, 1983, invented by Harold H. Cheffer, assigned to the NCR Corporation.

High Frequency Inverter, co-pending application, Ser. No. 525,371, filed on Aug. 22, 1983, invented by Harold H. Cheffer, assigned to the NCR Corporation.

BACKGROUND OF THE INVENTION

1. Field of the Invention

The present invention is directed to uninterruptible power supplies and more particularly to a high speed transfer switch operable to transfer alternating current to a load from a storage source of direct current upon the failure of the normal alternating current power line feeding such load.

2. Description of the Prior Art

In today's wide use of computers, data processors, controllers, etc. in data processing systems, it is extremely critical that the system be supplied with continuous power during its operation. Due to inadequate capacity and increasing load demands, commercially-supplied power is often subject to complete failure of the power signals or a reduction in the magnitude of the available voltage during peak demand periods. In cases where various customers subject the power system to sudden electrical loads, transients are generated in the system affecting the magnitude and phase of the supplied power signal.

Since the storage of data in a computer system is predicated on the continuous operation of the computer, power interruptions can adversely affect the integrity of the stored data. When the power drops abruptly, the computer will terminate operation probably with a high possibility of component damage. In order to overcome this situation, computers operating in a data processing system environment have been supplied with uninterruptible power supplies. Uninterruptible power supplies have been designed where the primary commercial power source and the reserve power source are connected in parallel. Both the primary power source and the reserve power source are continuously operated and both sources contribute to the energization of the load. This is a completely redundant system, and should either power source fail, the results are not apparent to the load which is continuously energized. Such an uninterruptible power supply system typically uses a ferroresonant transformer with two input primaries which are coupled to energize a single secondary. Through the use of properly designed high reluctant shunts, the two power sources do not transmit power to each other. Both power sources cooperate to share the load's power needs. The disadvantage of this particular arrangement is the expensive transformer design of a ferroresonant transformer having carefully designed high reluctant shunts and symmetrical construction to permit the two power sources to share the load.

An uninterruptible power supply arrangement which permits the use of a less expensive power coupling arrangement has been developed. The power supply includes a commercially A. C. line power source and a D.C. voltage energized inverter power source connected in parallel to a switching mechanism which alternately couples one or the other of the two power supplies to a load to be energized. This power supply design advantageously eliminates the need for an expensive ferroresonant transformer and provides redundancy to provide a substantially uninterruptible power to the load. However, the need for switching devices reduces the reliability of the circuit. In addition, the auxiliary power source comprising the inverter must be synchronized in frequency with the A. C. power line signal which requires complicated synchronizing circuitry. The switching action must be sufficiently fast to handle the transition of a load from a failed A. C. power line to the reserve power source or inverter circuit without inducing damaging transient signals into the circuit. The switching must disconnect the failed power source so it does not become a load for the active power source.

It is therefore a principal object of this invention to provide a switching circuit for use in an uninterruptible power supply which will switch at a high frequency rate.

It is another object of this invention to provide a switching circuit which will switch an A. C. power signal in phase with the line A. C. power signal within one-half cycle of operation.

It is a further object of this invention to provide a switching circuit for use in an uninterruptible power circuit which is simple in construction and low in cost.

SUMMARY OF THE INVENTION

These and other objects of the invention are accomplished by providing an inverter switching circuit which includes a pair of metal-oxide semiconductor field-effect transistors (MOSFETs) whose gate electrodes are connected through a transformer to a gating circuit which receives high frequency clock signals, a power failure signal and a signal indicating the zero crossing of the line A. C. signal. Upon sensing the occurrence of a power failure, the gating circuit will disable the high frequency clock signals from switching the transistors, thereby disconnecting the line A. C. output from the load. When the line A. C. is again available, the transistors are again operated by the clock signals to switch the line A. C. to the load in phase with the output signal of the inverter.

BRIEF DESCRIPTION OF THE DRAWINGS

FIGS. 3A–3E inclusive disclose the waveforms of the output signals occurring during the operation of the switching circuit;

FIG. 4 is a second embodiment of a portion of the switching circuit shown in FIG. 2.

DESCRIPTION OF THE PREFERRED EMBODIMENT

Figure 1:
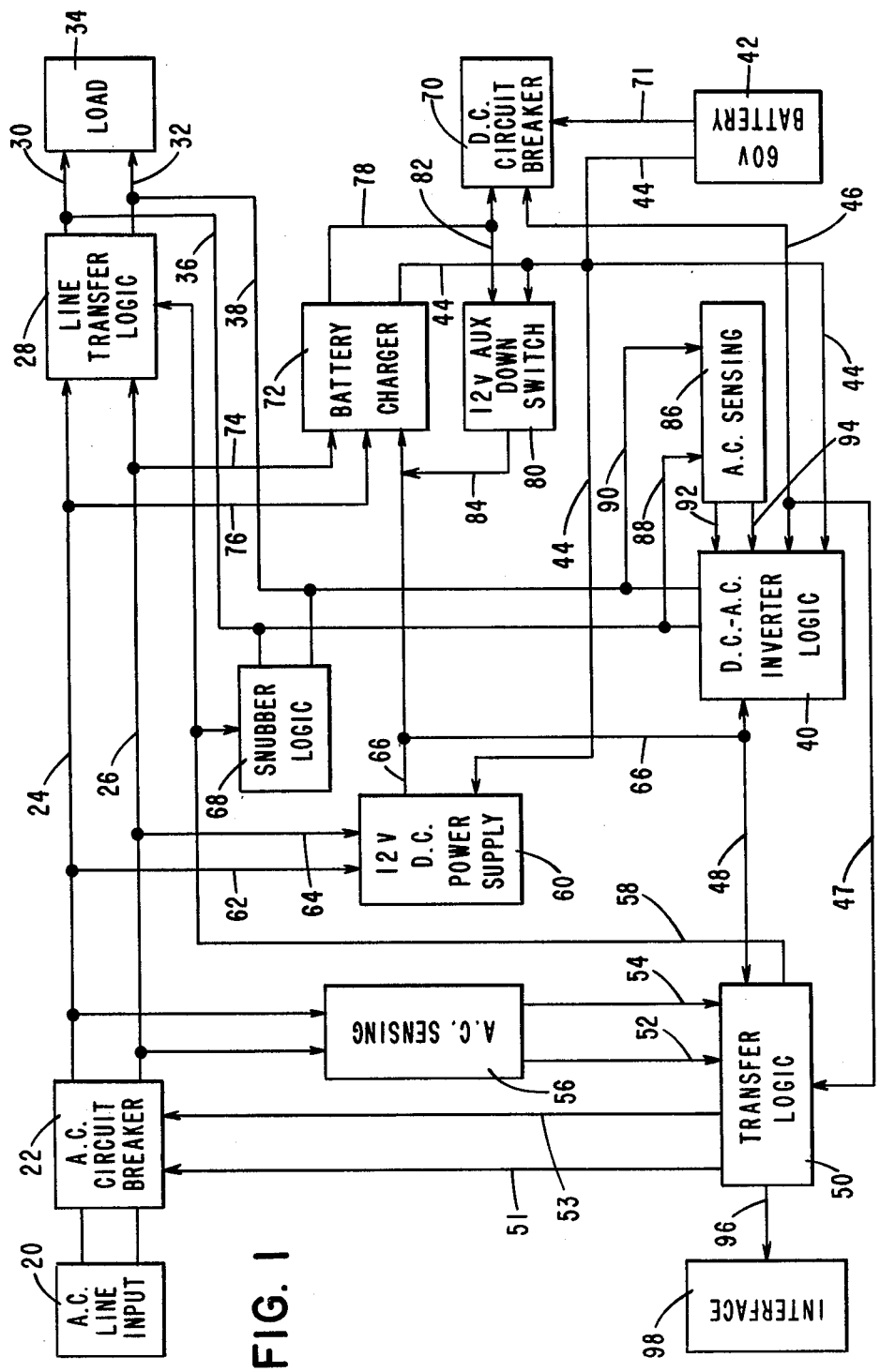
FIG. 1 is a block diagram of the uninterruptible power supply in which the switching circuit of the present invention is utilized.

Referring now to FIG. 1, there is shown a block diagram of the uninterruptible power supply in which the transfer switching circuit of the present invention is found. Included in the power supply is the A. C. line input circuit 20 over which appears the A. C. power signals supplied from a commercial power source and which are transmitted through an A. C. circuit breaker 22 and over lines 24, 26 to the line transfer logic circuit 28 which includes the transfer switching circuit of the present invention. The line transfer logic circuit 28 will output over lines 30, 32 to the load 34 an A. C. signal received over lines 24, 26 from the A. C. line input circuit 20. The load 34 also receives an A. C. signal transmitted over lines 36, 38 from a D.C. to A. C. inverter logic circuit 40 which, when enabled, will convert the D.C. signal output of a 60 volt battery 42 received over the common ground line 44 and line 46 to an A. C. signal. The inverter logic circuit 40 is enabled by signals appearing on bus 48 when generated by a transfer logic circuit 50 which receives signals over lines 52, 54 from an A. C. sensing circuit 56 representing the signal level of the A. C. signals being outputted from the A. C. circuit breaker 22. The transfer logic circuit 50, upon sensing a drop in the signal level of the A. C. signal, will output control signals over bus 48 to the inverter logic circuit 40 and bus 58 to the line transfer logic circuit 28 enabling the inverter logic circuit 40 to output A. C. power signals over lines 36, 38 to the load 34 through lines 30 and 32. When the A. C. line input 20 returns to its normal power level, the transfer logic circuit 50 will enable the line transfer logic circuit 28 to switch back to the input lines 24, 26 allowing the A. C. line input circuit 20 to supply the power over lines 36, 38 to the load 34. This switching of the line input circuit 20 occurs in phase with the original line frequency of the signals appearing at the line input circuit 20. The transfer logic circuit 50 outputs over lines 51, 53 signals for disabling the A. C. circuit breaker circuit 22 when a system overload occurs. The circuit 50 also outputs over line 96 to an interface circuit 98 a signal indicating the operating condition of the power supply.

Further included in the power supply is a 12 volt D.C. power supply 60 which receives the A. C. power signals over lines 62 and 64 and converts them to a 12 volt D.C. signal which is supplied over line 66 to power the various logic circuits in the power supply. Also included in the power supply is a snubber logic circuit 68 which eliminates any abnormal current spikes during the switching of the transfer logic circuit 28 between the A. C. line input circuit 20. The circuit 68 receives control signals over bus 58 from the transfer logic circuit 50 and from the inverter logic circuit 40. Associated with the 60 volt battery 42 is a D.C. circuit breaker 70 connected to battery 42 over line 71 and providing a current overload protection for the battery 42, a battery charging circuit 72 which converts the A. C. line signals appearing on lines 74, 76 to a charging current which is supplied to the battery 42 over line 78 during the time the A. C. line power signals are available and a 12 volt auxiliary down switch 80 which supplies a 12 volt D.C. signal to power the logic circuits upon the failure of the A. C. line input. The switch 80 drops the 60 volt signal supplied over line 82 from the battery 42 through the circuit breaker 70 and outputs the 12 volt D.C. signal over lines 84 and 66 to the required logic circuits of the power supply.

Associated with the inverter logic circuit 40 is an A. C. sensing circuit 86 receiving over lines 88, 90 the A. C. signal output of the inverter logic circuit 40 which is used to regulate the amplitude and shape of the A. C. signal outputted by the logic circuit 40. The sensing circuit 82 drops the A. C. output signal level to 5 volts to allow the signal to be compared with the signal being outputted by the logic circuit 40.

Figure 2:
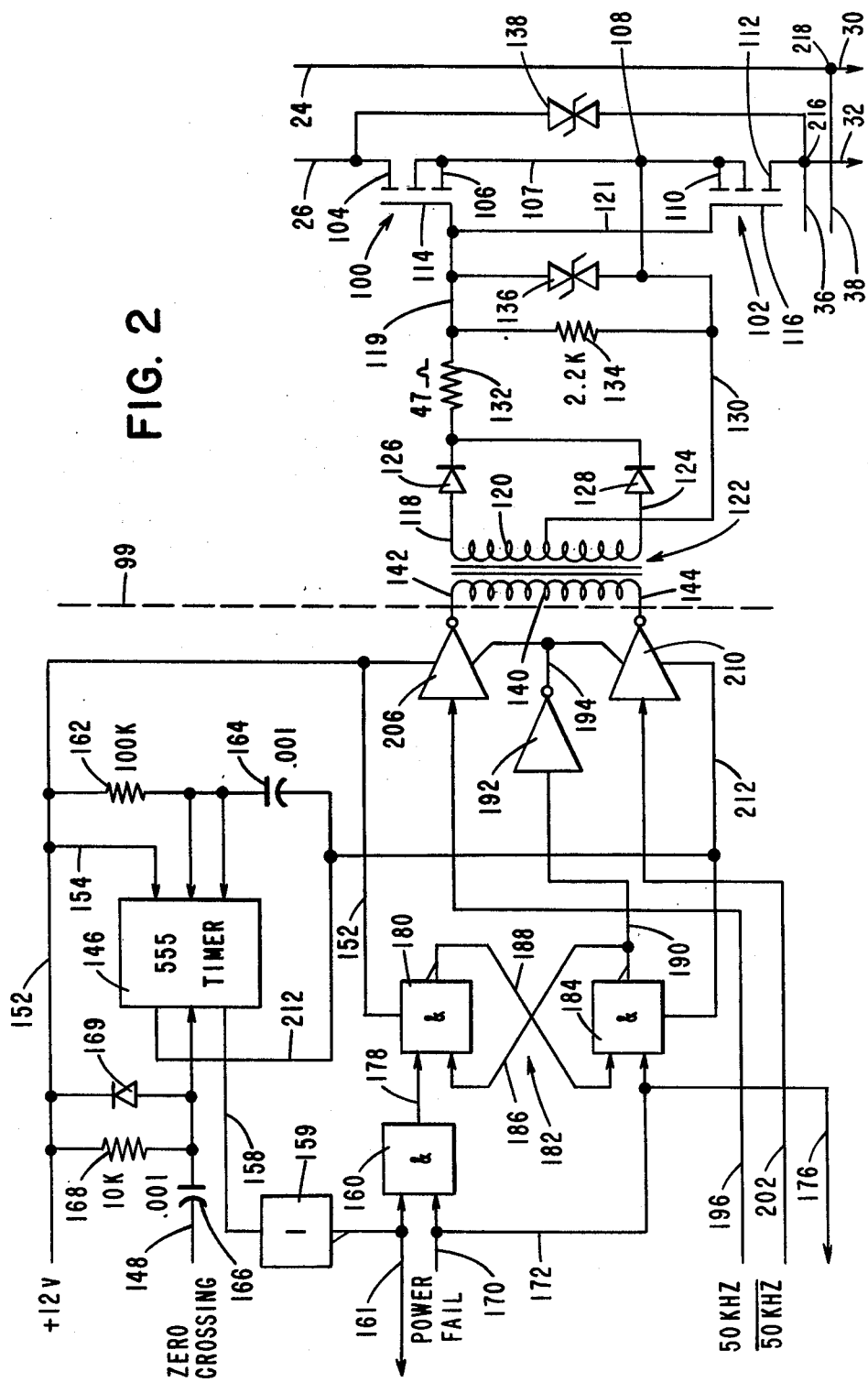
FIG. 2 is a schematic representation of the switching circuit of the present invention.

Referring now to FIG. 2, there is shown details of the logic circuit for switching between the A. C. line input signals appearing on lines 24, 26 (FIG. 1) and the output lines 36, 38 of the inverter logic circuit 40. The circuitry shown to the right of the dotted line 99 is located in the line transfer logic circuit 28 (FIG. 1) while the circuitry shown to the left of the dotted line is located in the transfer logic circuitry 50. Included in the line transfer logic circuit 28 are a pair of metal oxide field-effect transistors (MOSFETS) generally indicated by the numerals 100, 102 in which the drain electrode 104 of MOSFET 100 is connected to line 26 over which the A.C. line signals appear from the line input circuit 20 (FIG. 1). The source electrode 106 of the MOSFET 100 is coupled over line 107 through node 108 to the source electrode 110 of the MOSFET 102. The drain electrode 112 of MOSFET 102 is connected to the output line 32, which together with line 30 are connected to the load 34 (FIG. 1). The gate electrodes 114, 116 of MOSFETS 100 and 102 are connected over lines 118, 119 to the secondary winding 120 of a one-to-one transformer generally indicated by the numeral 122. Coupled to the output lines 118, 124 of the secondary windings 120 are the diodes 126, 128 for rectifying the alternating output signals of the transformer 122. A center tap line 130 of the transformer is connected to the electrodes 106, 110 of MOSFETS 100, 102 at node 108. Further included in the circuit are resistors 132, 134 which act in conjunction with the capacitance developed across the gate and source electrodes of the MOSFETS 100, 102 for filtering out any noise in the D.C. signal output of the diodes 126, 128 and the back-to-back voltage limiting zener diodes 136, 138.

The primary windings 140 of the transformer 122 are connected over lines 142, 144 which are part of the bus 58 (FIG. 1), to the transfer logic circuit 50 which includes a 555 timing circuit 146 receiving over line 148 the signal ZERO CROSSING which goes high when the A. C. power signal 149 (FIG. 3A) appearing on line 26 and transmitted from the A. C. line input circuit 20 (FIG. 1) crosses the zero reference point 150. For a complete description of the circuit for generating the signal ZERO CROSSING, reference should be made to the previously cited co-pending patent application NCR Docket No. 3440, by Rhoads et al., which application is fully incorporated into this application by reference.

The timing circuit 146 (FIG. 2) is connected to a 12 volt power supply (not shown) over lines 152, 54 and will output a signal over line 158 through the inverter 159 to one input of an AND gate 160. The signal appearing on the output of the inverter 159 is also transmitted over line 161 to an oscillator (not shown) in the transfer logic circuit 50 (FIG. 1) for controlling the generation of 60 Hz. line frequency clock signals. Reference should be made to the previously cited Rhoads et al. co-pending application Ser. No. 525,369, filed Aug. 22, 1983 for a complete description of the circuitry for generating the 60 Hz. clock signals. The width of the signal outputted by the timing circuit 146 is controlled by the resistor 162 and capacitor 164. The signal ZERO CROSSING is coupled to the timing circuit 146 through capacitor 166. A resistor 168 holds the input line 148 at a 12 volt level except when the signal ZERO CROSSING occurs which pulls the voltage level on the input line down to zero. When the signal ZERO CROSSING is removed, a diode 169 holds the signal appearing on line 148 at 12 volts.

The AND gate 160, in addition to receiving the output of the timing circuit 146 over line 158 also receives the low signal POWER FAIL on line 170 which occurs when the signal level of the line A. C. signal 149 (FIG. 3A) falls below a predetermined level. For a complete description of the comparator circuit used in generating the signal POWER FAIL, reference should be made to the previously-cited co-pending application of Rhoads et al., Ser. No. 525,369 filed Aug. 22, 1983. The signal POWER FAIL appearing on line 170 is also transmitted over line 172 and line 176 which is a part of the bus 48 (FIG. 1), to the inverter logic circuit 40, enabling the inverter logic circuit to start outputting an A. C. power signal derived from the 60 volt battery 42 (FIG. 1).

The output of the AND gate 160 is connected over line 178 to one input of a NAND gate 180 which forms a flip-flop circuit generally indicated by the numeral 182 with a second NAND gate 184. The other input of the NAND gate 180 is connected over line 186 to the output of gate 184 while the output of gate 180 is connected over line 188 to one input of the gate 184 which also receives the POWER FAIL signal over line 172 at its other input. The output of the flip-flop 182 appears on the output line 190 of gate 184 and is transmited through a 74C240 inverting driver circuit 192 whose output signal over line 194 will operate a pair of 74C240 inverting driver circuits 206 and 210. The driver circuit 206 receives over line 196 from an oscillator circuit (not shown) located in the transfer logic circuit 50 (FIG. 1) a plurality of 50 KHz. clock signals 198 (FIG. 3B) while the driver 210 receives the inverted 50 KHz. clock signals 200 (FIG. 3C) over line 202. The inverted output signals of the driver circuit 206 are transmitted over line 142 to one side of the primary windings 140 of the transformer 122. In a similar manner, the inverted output signals of the driver circuit 210 are transmitted over line 144 to the other side of the primary windings 140. The gate 180 and the driver circuit 206 are powered by a 12 volt signal appearing on line 152 while the gate 184 and driver circuit 210 are similarly powered by 12 volt signals appearing on the output line 212 of the timing circuit 146.

During the time the A. C. line input circuit 20 (FIG. 1) is outputting the required analog power signals 149 (FIG. 3A) over lines 24, 26 (FIG. 1), the MOSFETS 100, 102 will be biased by a 10 volt D.C. signal appearing across the gate-source electrodes enabling the MOSFETS to transmit the A. C. signals appearing on line 26 to the load 34 (FIG. 1) over line 32. At this time, the signal POWER FAIL will be high and the output of the timing circuit 146 will be low. In response to receiving these signals, the AND gate 160 will output a low signal enabling the gate 184 of the flip-flop 182 to output a high signal in response to receiving the POWER FAIL signal and the high signal from gate 180. The outputting of a high signal from gate 184 enables the gate 192 to output the 50 KHz. clock signals 198 (FIG. 3B) through the driver 206 to one side of the primary windings 140 of the transformer 122. Alternately, the gate 194 will output the 50 KHz. clock signals 200 (FIG. 3C) through driver 210 to the other side of the primary windings 140 enabling the transformer to output an analog signal over lines 118, 124 which signals are rectified by the diodes 126, 128 to produce a D.C. voltage pulse 214 (FIG. 3D). The voltage level of the pulse 214 is reduced to a 10 volt level by the resistors 132, 134 and is then applied across the gate and source electrodes of the MOSFETS 100, 102 enabling the MOSFETS to transmit the A. C. signals appearing on the input line 126 to the load 34 over line 32.

When the amplitude of the A. C. signal 149 falls below a predetermined level, the signal POWER FAIL will go low. At this time, the output signal of the timing circuit 146 goes low. These signals enable the gate 160 to output a low signal to the NAND gate 180 resetting the flip-flop 182 enabling the gate 184 to output a low signal over line 190 to the driver circuit 192, disabling the driver circuits 206 and 210 from transmitting the clock signals 198 (FIG. 3B) and 200 (FIG. 3C) to the transformer 122. This action results in the shutting off of the MOSFETS 100, 102 and the A. C. line input circuit 20 (FIG. 1) from the load 34. At this time the low signal POWER FAIL will be transmitted over line 176 of the bus 48 (FIG. 1) to the inverter logic circuit 40 which in response to receiving this signal will output A. C. signals over lines 36, 38 which are connected to the output lines 30, 32 at nodes 216, 218 (FIG. 2) for transmission to the load 34.

When the A. C. line input circuit 20 (FIG. 1) is returned to its original power level, the signal POWER FAIL will return to a high level. The timing circuit will output a high signal when the signal ZERO CROSSING goes high. The occurrence of the high signals at the input of gate 160 results in the setting of the flip-flop 182 to output a high signal over line 190, enabling the driver circuit 192 to operate the driver circuits 206 and 210 to gate the 50 KHz. clock signals 198, 200 (FIGS. 3B and 3C) resulting in the enabling of the MOSFETS 100, 102 in the manner described previously. It will thus be seen that the MOSFETS 100, 102 are turned off at the time the power fail occurs, and are turned on in phase with the line A. C. power signal upon its return.

Referring now to FIG. 4, there is shown another embodiment of a portion of the transfer switch circuit in which a single MOSFET is used. Included in the circuit is a MOSFET generally indicated by the numeral 216 having its drain electrode 218 connected to the cathode end of a diode 220 whose anode end is connected to the A. C. input line 26. The source electrode 222 is connected to the anode end of a diode 224 whose cathode end is connected to the input line 32 (FIGS. 1 and 2) and to the load 34. A 200 volt zener diode 226 is shunted across the source-drain electrodes of the MOSFET 216 while a second diode 228 is shunted across the drain electrode 218 and the diode 224. The gate electrode 230 of the MOSFET 216 is connected to the output line of the diodes 124, 126 (FIG. 2) while the center tap line 130 of the transformer is connected to the source electrode 222 at node 232. A diode 234 is shunted across the source electrode 222 and the diode 220. When the MOSFET 216 is enabled by the 10 volt pulse applied across the lines 119, 130 (FIG. 2), the positive going portion of the A. C. signal will go through the diodes 220, 224 and the MOSFET 216 to the load 34. When the negative going portion of the A. C. signal appears on line 26, the signal will go through the diodes 228, 234 and the MOSFET 216 to the load 34. When the MOSFET is turned off, the A. C. input signal is unable to be transmitted to the load. This arrangement should be contrasted with the embodiment disclosed in FIG. 2 wherein the MOSFET 100 will block the positive-going signal when turned off and MOSFET 102 will block the negative-going signal when turned off. It will thus be seen from this construction that a single MOSFET will control the application of power signals to a load in accordance with the source of the power signals that is available at the time.

The integrated circuit elements disclosed herein are commercially available from the National Semiconductor Corporation of Mountain View, Calif. The transformer 122 is commercially available from the RAF Magnetics Corporation of Deland, Fla.

Numerous modifications and adaptations of the system of the present invention will be apparent to those skilled in the art, and thus it is intended by the appended claims to cover all such modifications and adaptations which fall within the true spirit and scope of this invention.

I claim:

1. In an uninterruptible power supply which includes a first source of A. C. signals and a second source of A. C. signals, a circuit for switching between the first and second source of A. C. signals to supply the A. C. signals to a load including:
   a source of first control signals generated in response to the failure of the first source to supply A. C. signals for enabling said second source of A. C. signals to supply the signals to the load;
   a source of high frequency clock signals;
   switching means for connecting said first source of A. C. signals to the load when enabled;
   transformer means for enabling said switching means in response to receiving said clock signals;
   and gating means connected to said transformer means and responsive to receiving said first control signals for disabling said transformer means from receiving said clock signals whereby said switching means is disabled from connecting said first source to the load.

2. The circuit of claim 1 which further includes a source of second control signals indicating the zero crossing of the A. C. signals from the first source;
   timing means connected to said gating means and enabled by one of said second control signals to output a third control signal to said gating means;
   and a source of fourth control signals generated in response to the return of said first source to supply A. C. signals, whereby said gating means in response to receiving said third and fourth control signals enables said transformer means to receive said high frequency clock signals enabling said switching means to connect said first source of A. C. signals to the load.

3. The circuit of claim 1 in which said transformer means includes a transformer having primary windings connected to said gating means and secondary windings, said switching means comprising a plurality of metal oxide semiconductor field effect transistors having their gate electrodes connected to the secondary windings and their drain electrodes connected between the first source of A. C. signals and the load and said gating means includes driver means connected to the primary windings of the transformer and receiving said high frequency clock signals, said driver means being enabled to transmit the clock pulses to the primary windings in response to the gating means receiving said third and fourth control signals whereby said secondary windings transmit and send the clock signals to the transistors enabling the transistors to connect the first source of the A. C. signals to the load.

4. The circuit of claim 3 which includes rectifying means connected to said secondary windings and the gate electrodes of the transistors to output a steady current to the gate electrodes for operating said transistors.

5. The circuit of claim 4 in which the secondary windings have a center tap portion connected to the source electrode of said transistors whereby the steady current applied to the gate electrodes operates the transistors to supply A. C. signals from the first source to the load.

6. The circuit of claim 5 in which the transistors include a first transistor having its drain electrode connected to the first source of A. C. signals and a second transistor having its drain electrode connected to the load, the source electrodes of the transistors being interconnected to transfer the A. C. signals from the first source to the load.

7. In an uninterruptible power supply for supplying A. C. signals to a load which includes a source of A. C. signals and an inverter for supplying A. C. signals from a D.C. source, a circuit for switching the source of A. C. signals into and out of the load including:
   a source of first control signals generated in response to a failure of the source of A. C. signals to supply the A. C. signals, said first control signals enabling said inverter to supply A. C. signals to the load;
   a source of high frequency drive signals;
   switching means connected to said source of A. C. signals and the load for coupling said source to the load when enabled;
   a drive transformer connected to said switching means for enabling said switching means when operated;
   and a bi-stable means connected to the source of said first control signal and said drive transformer, said bi-stable means being switched to a first state upon the generation of said first control signals to output a second control signal to said drive transformer disabling said drive transformer whereby said switching means will be disabled, thereby disconnecting the source of A. C. signals from the load.

8. The circuit of claim 7 which further includes drive means connected to said bi-stable means and to said transformer for transmitting said drive signals to said transformer when enabled by said second control signal, thereby operating said transformer.

9. The circuit of claim 8 which further includes:
   a source of third control signals indicating the zero crossing of the A. C. signal applied by the source;
   an AND gate connected to said bi-stable means;
   timing means connected to said AND gate and enabled by one of said third control signals to output a fourth control signal to said AND GATE;
   and a source of fifth control signals connected to said AND gate and generated in response to the source again supplying A. C. signals to the load whereby said AND gate in response to receiving said fourth and fifth control signals will output a sixth control signal to said bi-stable means resetting said bi-stable means to a second state to output a seventh control signal to said drive means enabling said drive means to transfer said drive signals to said transformer whereby said switching means are enabled to connect the source of A. C. signals to the load.

10. The circuit of claim 9 in which said drive transformer includes primary windings connected to said drive means and secondary windings for outputting drive signals applied to said primary windings, said switching means comprising a plurality of metal oxide semiconductor field effect transistors having their gate electrodes connected to the secondary windings and their drain electrodes connected between the source of A. C. signals and the load whereby upon said drive means receiving said seventh control signal, the secondary windings of the transformer will output the drive signals to the gate electrodes of said transistors enabling the drain electrodes of the transistors to connect the source of A. C. signals to the load.

11. The circuit of claim 9 in which said drive transformer includes primary windings connected to said drive means and secondary windings for outputting drive signals applied to said primary windings, said switching means includes a metal oxide semiconductor field effect transistor having its gate electrode connected to the secondary windings, the drain electrode connected to the source of A. C. signals and the source electrode connected to the load for transmitting the positive portion of the A. C. signal to the load when enabled, said power supply further includes unidirectional means connected across said drain-source electrodes for transmitting the negative portion of the A. C. signal to the load whereby upon said drive means receiving said seventh control signal, the secondary windings will output the drive signals to the gate electrode of said transistor enabling the drain electrode to connect the source of A. C. signals to the load.

12. The circuit of claim 10 in which said drive signals comprise 50 KHz. drive signals.

13. The circuit of claim 12 which includes rectifying means connected to said secondary windings and the gate electrode of said transistor for supplying a steady current to said gate electrode, said secondary windings further includes a center tap portion connected to the source electrode of the transistors whereby the steady current applied to the gate electrode operates the transistors to allow the A. C. signals from the source to be transmitted to the load.

* * * * *